United States Patent [19]

Tatsuno et al.

[11] Patent Number: 4,688,880
[45] Date of Patent: Aug. 25, 1987

[54] HOLOGRAM LENS

[75] Inventors: Kimio Tatsuno, Kokubunji; Keiji Kataoka, Kawagoe; Seiji Yonezawa, Hachioji, all of Japan

[73] Assignee: Hitachi, Ltd., Tokyo, Japan

[21] Appl. No.: 632,848

[22] Filed: Jul. 20, 1984

[30] Foreign Application Priority Data

Jul. 25, 1983 [JP] Japan ................. 58-134325

[51] Int. Cl.$^4$ ............................. G02B 5/32
[52] U.S. Cl. ................................. 350/3.72
[58] Field of Search ............ 350/3.72, 162.21, 3.7, 350/3.65

[56] References Cited

U.S. PATENT DOCUMENTS

| | | | |
|---|---|---|---|
| 4,306,763 | 12/1981 | Huignard | 350/3.72 |
| 4,312,569 | 1/1982 | Harada et al. | 350/162.21 |
| 4,412,719 | 11/1983 | Fienup | 350/3.7 |

FOREIGN PATENT DOCUMENTS 0046218  2/1982  European Pat. Off. ........... 350/3.72

OTHER PUBLICATIONS

Jagoszewski, E., "The Influence of Hologram Surface Curvature on the Holographic Image Quality" *Optik* 69, No. 2, pp. 85–88 (1985), (paper given, outside U.S., on Jun. 12–16, 1984).

*Primary Examiner*—Bruce Y. Arnold
*Attorney, Agent, or Firm*—Antonelli, Terry & Wands

[57] ABSTRACT

A hologram lens of the present invention has a spherical hologram surface, the center of said spherical surface being in agreement with a focal point of the lens, and the radius of said spherical surface being in agreement with a focal distance of the lens. Therefore, the hologram lens of the invention produces little aberration.

12 Claims, 9 Drawing Figures

(a)  (b)

HOLOGRAM LENS

BACKGROUND OF THE INVENTION

The present invention relates to a hologram lens, and particularly to an aberration-reduced spherical hologram lens which is free from coma aberration, and which can be suitably used as an optical head of an optical memory such as optical disc device or as an objective lens of scanning optics in a laser printer.

It is desired that the objective lens employed in the optical head of an optical disc device and the like is as small as possible, light in weight, and is inexpensive. However, as the numerical aperture NA of the objective lens increases, there develops lens aberration. At present, the aberration has been corrected by combining several single lenses. For instance, the objective lens employed in the optical head of an optical disc device consists of an objective lens having a numerical aperture NA of about 0.5 on the side of the optical disc and an objective lens having a numerical aperture NA of about 0.2 on the side of the light source. Usually, the former lens assembly consists of three to four lenses assembly and the latter lens consists of two lenses.

Therefore, a limitation is imposed on reducing the weight of objective lens or on reducing the manufacturing cost thereof. This makes it difficult to enhance the tracking performance of pit trains, that is carried out at the time of reproducing or recording signals of the optical disc, and makes it difficult to enhance the performance of an actuator which effects automatic focusing, to reduce the size thereof, and to reduce the manufacturing cost thereof. This fact also hinders the whole optical head from being constructed in a small size and in a reduced weight.

Under such circumstances, it is an assignment to reduce the size and weight of the objective lens, and some proposals have been offered. Among them, attention has been given to a hologram lens utilizing the art of holography owing to its features such as reduced weight, cheap cost, and easy replication. According to the holography in principle, a given wave front is recorded in the form of an interference pattern which can be reproduced. Therefore, a hologram lens having a numerical aperture of greater, for instance, than 0.5, i.e., having a large divergence angle of beams, can be obtained easily, and imaging properties like those of ordinary optical lenses can also be obtained. With the hologram lens, however, the wave front must be reproduced under quite the same conditions as those of the recording operation. If the conditions are changed even by slightest amounts, there develops a serious wave front aberration. Therefore, the optical axes must be positioned maintaining a very high precision, hindering the hologram lens from being placed in practical use. Summary of the Invention The object of the present invention is to provide a hologram lens which precludes the above-mentioned defects, and which produces aberration in reduced amounts even when the conditions are different between the recording operation and the reproducing operation.

In the hologram lens, coma aberration is dominant among five types of Seidel aberrations. This stems from the fact that a hologram plate has a flat surface, and sine conditions are not satisfied. According to the present invention, therefore, the above object is accomplished by providing a spherical hologram lens in which the center of a hologram surface is brought into agreement with the focal point of a lens, the hologram has such a radius that the curvature thereof is brought into agreement with the focal distance of the lens, and the sine condition is satisfied to remove coma aberration.

The hologram lens referred to in the present invention includes a grating lens which records an interference pattern by an electron beam, a zone plate, and replica lenses thereof, in addition to a so-called hologram lens which optically records an interference pattern by using two beams, i.e., by using an object beam and a reference beam.

DESCRIPTION OF THE PREFERRED EMBODIMENTS

Prior to explaining the present invention, problems of a conventional hologram lens will be described below in detail with reference to the drawings.

Figure 1:
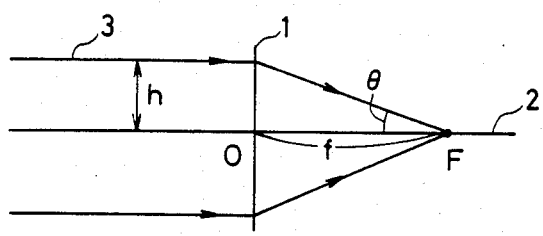
FIG. 1 is a diagram showing a conventional hologram lens.

FIG. 1 shows a conventional in-line-type hologram lens. If the focal distance of a hologram lens 1 is denoted by f, the radius of an incident beam 3 by h, and the divergence angle which determines a numerical aperture NA of the hologram lens 1 by $\theta$, there is obtained a relation, $$h = f \tan \theta \tag{1}$$

This, however, does not satisfy a well-known sine condition, i.e., $$h = f \sin \theta \tag{2}$$

and, hence, large coma aberration develops when the incident beam 3 is slightly deviated from an optical axis 2.

Figure 2:
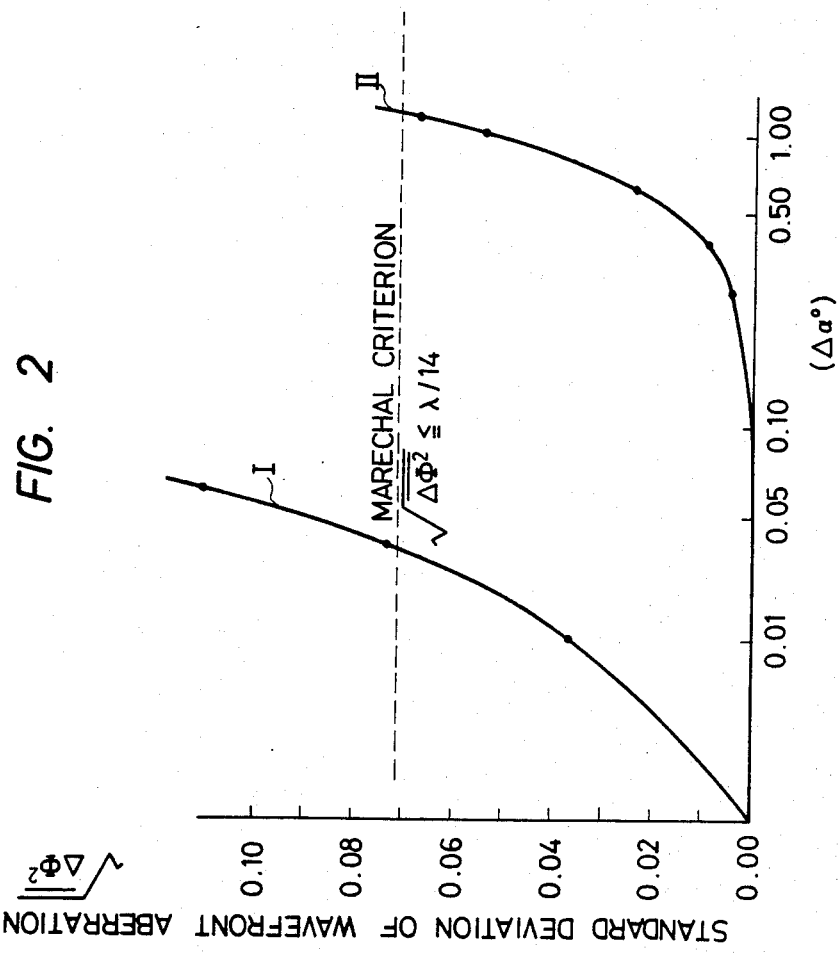
FIG. 2 is a diagram showing wave front aberration of a hologram lens.

FIG. 2 shows a calculated standard deviation of wave front aberration relative to the inclination $\Delta \alpha$ which is an incident angle of the incident beam 3 with respect to the optical axis 2 of the hologram lens 1 of the practical in-line-type hologram lens. It will be recognized that coma aberration (represented by a curve I) is dominant in the range of third order aberration. If the coma aberration is removed, there remains astigmatism (represented by a curve II) only. Therefore, if a well-known wave front aberration tolerance $\lambda/14$ of Marechal is used as a reference, the tolerable range can be widened up to $\Delta\alpha=1°$ in the case when the numerical apperture NA is, for example, 0.5, provided the coma aberration is removed, in contrast with the range of up to $\Delta\alpha=0.05°$ that was tolerated by the conventional art. Therefore, the hologram lens can be put into practical use.

In the conventional hologram lens as mentioned earlier, the hologram plate has a flat surface. According to the hologram lens of the present invention, on the other hand, the plate has a spherical surface, the center of the sphere is brought into agreement with the focal point of the hologram lens, and the radius of the sphere is so selected as will be equal to the focal distance of the hologram lens. With the thus constructed spherical hologram lens, the sine condition given by the relation (2), i.e., $$h = f \sin \theta$$

holds true, and the coma aberration is removed in the paraxial.

Figure 3:
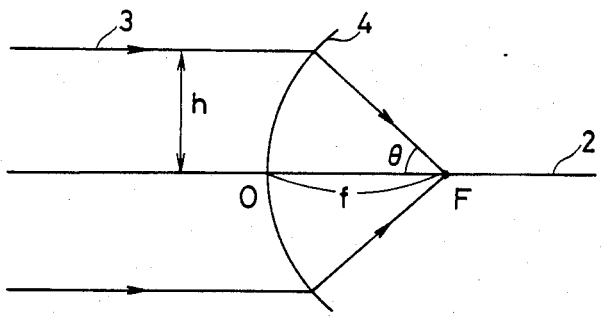
FIG. 3 is a diagram showing an in-line-type spherical hologram lens according to the present invention.

FIG. 3 is a diagram showing an embodiment of the present invention, where the incident beam consists of a parallel beam. The hologram surface of a hologram lens 4 has a center that is in agreement with the focal point F of the lens, and assumes such a spherical surface that the radius thereof is equal to the focal distance f of the lens.

Figure 4:
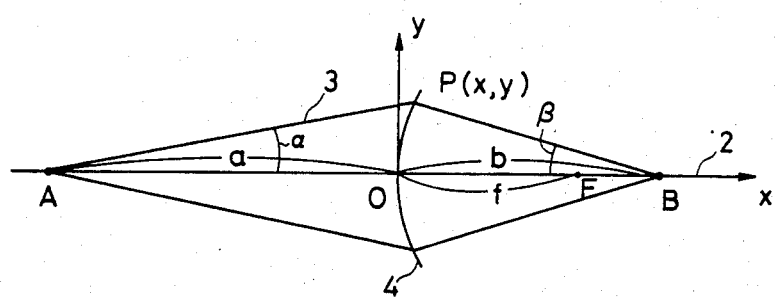
FIG. 4 is a diagram showing an imaging-type spherical hologram lens according to the present invention.

The embodiment of FIG. 3 deals with the case in which a parallel beam is incident upon the spherical hologram lens. The hologram lens, however, can also be adapted to the case where a divergent beam is incident as shown in FIG. 4. In this case, the sine condition is given by, $$\frac{\sin \beta}{\sin \alpha} = \frac{b}{a} \qquad (3)$$

where a and b denote distances from an object point A and an imaging point B to the center O of the lens, respectively, and $\alpha$ and $\beta$ denote angles defined by rays from the object point A and the imaging point B to a point P on the lens 4 with respect to the optical axis 2. A hologram surface which satisfies this condition is found below.

If the coordinate at the point P is (x,y) with the center O of the lens as an origin, there hold the following relations:

$$x = \overline{AP} \cos \alpha - a$$

$$x = b - \overline{BP} \cos \beta$$

$$y = \overline{AP} \sin \alpha$$

$$y = \overline{BP} \sin \beta$$

By eliminating $\overline{AP}$ and $\overline{BP}$ from these relations, the following relation is obtained while taking the relation (3) into consideration.

$$\left( x - \frac{ab}{a+b} \right)^2 + y^2 = \left( \frac{ab}{a+b} \right)^2$$

Here, the focal distance f of the lens is given by, $$\frac{1}{a} + \frac{1}{b} = \frac{1}{f}$$

and, hence $$f = \frac{ab}{a+b}$$

Accordingly, there is obtained a relation, $$(x-f)^2 + y^2 = f^2$$

The above relation represents a circle having a center (f,O) and a radius f. Therefore, if the hologram surface assumes such a spherical surface, the relation (3) which establishes the sine condition is satisfied.

Figure 5:
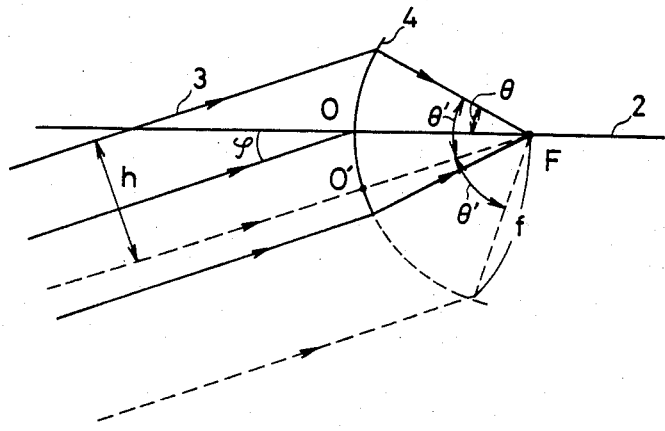
FIG. 5 is a diagram showing an off-axis-type spherical hologram lens according to the present invention.

The present invention can be further adapted to an off-axis-type hologram lens which is illustrated in FIG. 5. That is, considered below is a case where the parallel beam 3 indicated by solid lines is incident upon the spherical hologram lens 4 at an angle $\phi$ with respect to the optical axis FO. In this case, if a line O'F which passes through the focal point F and which is in parallel with the beam incident perpendicularly upon the hologram surface, is regarded as a new optical axis, and if the divergence angle $\theta$ of the lens is replaced by the angle $\theta'$, the sine condition, i.e., $$h = f \sin \theta'$$

holds true like the case of the in-line-type hologram lens (FIG. 3).

Figure 6:
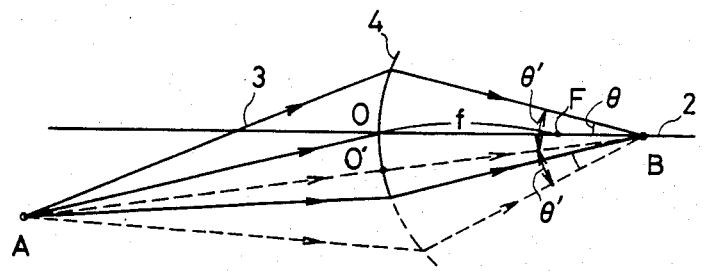
FIG. 6 is a diagram showing an off-axis imaging-type spherical hologram lens according to the present invention.

It will be obvious from the description related to FIG. 5 that the above idea also holds true even when the imaging spherical hologram lens shown in FIG. 4 is replaced by the one which is of the off-axis-type. The embodiment of this case is illustrated in FIG. 6.

Figure 7:
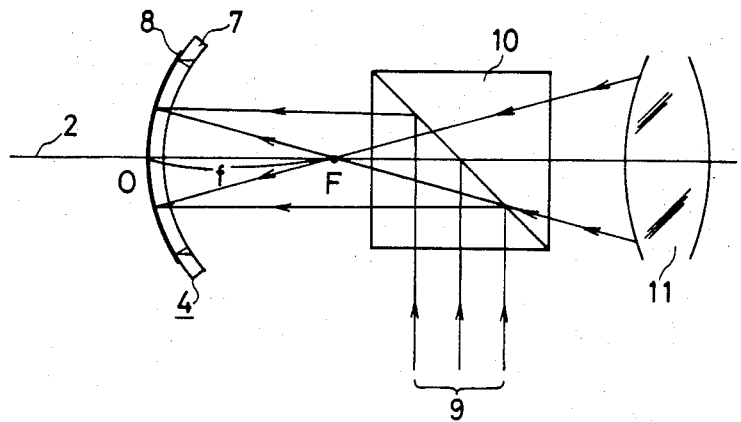
FIG. 7 is a diagram for illustrating a method of preparing a spherical hologram lens according to the present invention.

The spherical hologram lens of the present invention is prepared as described below. The following description deals with the case of preparing the in-line-type spherical hologram lens as shown in FIG. 7. A coherent light is split into two beams through a beam splitter (not shown) or the like. One beam is a parallel or collimated reference beam 9 which is projected to a recording material 8 provided on a spherical substrate 7 via a beam splitter 10. Another beam is allowed to pass through a lens 11 having a desired divergence angle to form a wave front that is to be recorded, and is projected as an object beam to the recording material 8 via the substrate 7 where it is interfered by the reference beam 9 to form a hologram as interference fringe pattern on the holographic layer 8. The spherical hologram lens 4 is thus prepared.

Further, the reference beam is set to be in alignment with the object beam, i.e., on the same axis as the object beam.

In order to remove the effect of refraction of the substrate 7, furthermore, it is allowable to apply a recording material onto the inner side of the substrate 7 to prepare a hologram by the same method as the one described above, and then to transfer the thus prepared hologram onto the outer side of the spherical surface of another substrate.

It is also allowable to use a so-called illumination hologram instead of the beam splitter 10 which sets the reference beam in alignment with the body beam.

The substrate 7 of hologram lens is composed of a glass or a plastic material, and the holographic layer of photosensitive material 8 is composed of silver salt, photoresist, gelatine dichromate, or the like. Further, if a relief mold is employed, the hologram can be reproduced in large amounts by press-adhesion.

Figure 8:
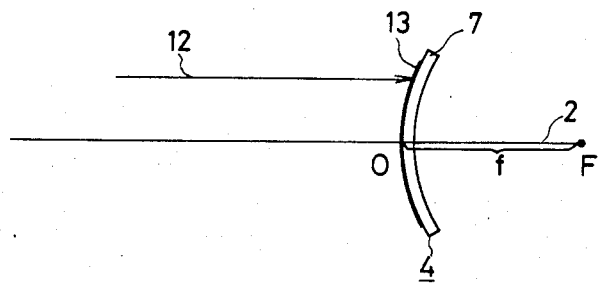
FIG. 8 is a diagram for illustrating a method of preparing a spherical grating lens.

The hologram can also be prepared by using an electron beam. In this case, the hologram is called a grating lens. Parameters such as wavelength, incident angle, focal distance, thickness of the lens substrate, index of refraction and the like are input beforehand to calculate a grating pattern by a computer. The grating pattern is then recorded on the photosensitive material such as a PMMA film 13 provided on the spherical substrate 7 by using an electron beam 12 as shown in FIG. 8. Even in this case, it is possible to prepare a lens which is free from coma aberration if the lens substrate 7 is formed in a spherical shape to obtain a spherical grating lens which satisfies the sine condition.

In any case, replication can be easily effected by press-adhesion if the hologram lens is obtained in the relief type having concentric relief patterns or in the form of a grating lens having concentric grating patterns.

Figure 9:
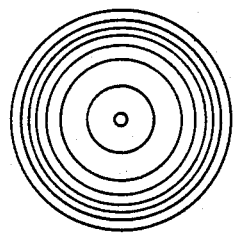
FIG. 9 is a diagram illustrating the concept of the spherical hologram lens according to the present invention.
Figure 9:
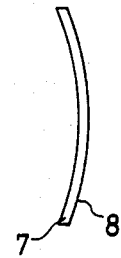

FIG. 9 is a diagram showing the aberration-reduced spherical hologram lens according to the present invention that was mentioned in the foregoing, wherein the diagram (a) is a front view and the diagram (b) is a section view. The concentric pattern shown in FIG. 9(a) represents concentric interference fringe patterns or a grating pattern that is recorded.

In using the spherical hologram lens of the present invention as an objective lens of, for instance, an optical disc device, when a disc substrate or parallel flat plate (having a thickness t and a refractive index n) composed of a glass or the like is interposed between the hologram lens and the recording film, it is recommended that the distance between the hologram surface and the recording film be selected to be $$f + \left(1 - \frac{1}{n}\right) t$$

and that a radius of curvature of the hologram surface is selected to be slightly greater than the focal distance f in order to reduce spherical aberration that results from the parallel flat plate, such that the wave front aberration is minimized as a whole.

In the ultraviolet-ray regions and soft X-ray regions, furthermore, a solid material exhibits such a large light absorption coefficient that ordinary lenses are not utilizable. The spherical hologram lens of the present invention, however, can be used even in the regions of such short wavelengths. Namely, the spherical hologram lens of the present invention finds extensive applications such as an objective lens of a microscope having a high magnifying power.

As mentioned above, the spherical hologram lens of the present invention satisfies the sine conditions and does not produce coma aberration. Therefore, the spherical hologram lens of the present invention offers a field angle which is about 10 times as great as that of the convention flat hologram lens, and can be used as an objective lens of an optical head in an optical disc device or as a coupling lens. Thus, the spherical hologram lens of the present invention offers its intrinsic features such as reduced weight, reduced size, low manufacturing cost, and easiness of replication. According to the present invention, the weight of the optical head can be reduced to one-fifth, and the size can be reduced to about one-hundredth in volume.

What is claimed is:

1. A hologram lens comprising a spherical surface having concentric fringe patterns, wherein the center of said spherical surface is located in a focal point of the lens.

2. A hologram lens according to claim 1, wherein said spherical surface includes a photosensitive material disposed on a spherical substrate, said photosensitive material having been exposed with a beam that is collimated and aligned with an optical axis of said spherical surface, and said photosensitive material having been exposed with a beam that passes through the center of said spherical surface, such that a hologram is formed on said photosensitive material enabling formation of said hologram lens.

3. A hologram lens according to claim 2, wherein said photosensitive material is disposed on the inner side of said spherical substrate, and a hologram pattern formed on said photosensitive material is transferred to the outer side of another spherical substrate which has the same shape as said spherical substrate.

4. A hologram lens comprising a holographic layer formed to have a spherical surface, said holographic layer having concentric fringe patterns forming a lens, wherein the center of said spherical surface is located in a focal point of said lens.

5. A hologram lens according to claim 4, further comprising a substrate having said spherical surface for supporting said holographic layer.

6. A hologram lens according to claim 5, wherein said concentric fringe patterns in said holographic layer comprise the interference pattern of a first beam diverging from said center of said spherical surface with a second collimated beam set to be on the same axis as said first beam.

7. A hologram lens according to claim 4, wherein said concentric fringe patterns in said holographic layer comprise the interference pattern of a first beam diverging from said center of said spherical surface with a second collimated beam set to be on the same axis as said first beam.

8. A method making a hologram lens, said method comprising the steps of:
   irradiating a holographic layer coated on a spherical surface of a substrate with a first beam which diverges from a center of said spherical surface;
   irradiating said holographic layer with a second collimated beam which is set to be on the same axis as said first beam; and
   recording in said holographic layer concentric patterns which are formed by interference fringe patterns of said first beam with said second beam, whereby said concentric fringe patterns of said holographic layer form a lens having a focal distance which is equal to the radius of said spherical surface.

9. A method according to claim 8, wherein said holographic layer is applied onto the outer side of said substrate, and said holographic layer is irradiated through said substrate with said first and second beams.

10. A method according to claim 8, wherein said holographic layer is applied onto the inner side of said substrate, and said concentric fringe patterns formed in said holographic layer are transferred to the outer side of another substrate which has the same shape as said spherical surface.

11. A hologram lens comprising a spherical surface having concentric grating patterns, wherein the center of said spherical surface is located in a focal point of the lens.

12. A hologram lens comprising a spherical surface having concentric relief patterns, wherein the center of said spherical surface is located in a focal point of the lens.

* * * * *